(12) United States Patent
Goyal et al.

(10) Patent No.: US 10,572,522 B1
(45) Date of Patent: Feb. 25, 2020

(54) DATABASE FOR UNSTRUCTURED DATA

(71) Applicant: Impira Inc., San Francisco, CA (US)

(72) Inventors: Ankur Goyal, San Francisco, CA (US); Richard Stebbing, San Francisco, CA (US); Michael Andrews, San Francisco, CA (US)

(73) Assignee: Impira Inc., San Francisco, CA (US)

( * ) Notice: Subject to any disclaimer, the term of this patent is extended or adjusted under 35 U.S.C. 154(b) by 0 days.

(21) Appl. No.: 16/231,033

(22) Filed: Dec. 21, 2018

(51) Int. Cl.
| | | |
|---|---|---|
| *G06F 7/00* | (2006.01) | |
| *G06F 17/30* | (2006.01) | |
| *G06F 16/338* | (2019.01) | |
| *G06F 16/901* | (2019.01) | |
| *G06N 20/00* | (2019.01) | |
| *G06N 5/04* | (2006.01) | |
| *G06F 16/21* | (2019.01) | |

(52) U.S. Cl.
CPC .......... *G06F 16/338* (2019.01); *G06F 16/211* (2019.01); *G06F 16/9024* (2019.01); *G06N 5/04* (2013.01); *G06N 20/00* (2019.01)

(58) Field of Classification Search
CPC ..... G06F 16/338; G06F 16/211; G06N 20/00; G06N 5/04
USPC ......................................................... 707/701
See application file for complete search history.

(56) References Cited

U.S. PATENT DOCUMENTS

| | | | | | |
|---|---|---|---|---|---|
| 7,313,567 | B1 * | 12/2007 | Leung | ..................... | G06F 16/88 707/797 |
| 8,046,751 | B1 * | 10/2011 | Avadhanula | .............. | G06F 8/75 717/104 |
| 8,739,016 | B1 * | 5/2014 | Goldman | ............... | G06Q 50/01 715/200 |
| 2006/0167928 | A1 * | 7/2006 | Chakraborty | ....... | G06F 17/2205 |
| 2007/0179784 | A1 * | 8/2007 | Thambiratnam | ....... | G10L 15/26 704/255 |
| 2011/0040808 | A1 * | 2/2011 | Joy | ........................... | G06F 8/20 707/812 |
| 2013/0318160 | A1 * | 11/2013 | Beraka | .................. | H04L 67/104 709/204 |
| 2014/0074889 | A1 * | 3/2014 | Neels | ..................... | G06F 17/248 707/779 |
| 2014/0108322 | A1 * | 4/2014 | Buchanan | ................ | G06N 5/02 706/50 |
| 2014/0156581 | A1 * | 6/2014 | Jayaraman | ............... | G06N 5/02 706/46 |

(Continued)

*Primary Examiner* — Binh V Ho

(74) *Attorney, Agent, or Firm* — Van Pelt, Yi & James LLP

(57) ABSTRACT

A technique for running queries is provided that includes a method and system for managing unstructured data and for capturing uncertain relationships between pieces of data. A structural schema is generated from unstructured data that is configured to evolve in response to user input and incoming data that is changing over the course of an application. The schema is also configured to capture relationships between data that are uncertain or difficult for a person to capture in a consistent or comprehensive manner. The technique is especially advantageous for running and returning meaningful responses to queries that require an ability to connect pieces of data received from unstructured data or disparate sources, including user input, or where the query is directed to information that is uncertain or was not anticipated as useful or relevant at the time the data containing the information was originally received.

10 Claims, 8 Drawing Sheets

(56) References Cited

U.S. PATENT DOCUMENTS

| | | | |
|---|---|---|---|
| 2014/0201124 A1* | 7/2014 | Proctor | G06N 5/047 706/47 |
| 2015/0095303 A1* | 4/2015 | Sonmez | G06N 5/003 707/707 |
| 2016/0371238 A1* | 12/2016 | Heavenrich | G06F 17/2264 |
| 2017/0032052 A1* | 2/2017 | Raman | G06F 16/9024 |
| 2017/0039341 A1* | 2/2017 | Shklarski | G16H 50/70 |
| 2017/0075904 A1* | 3/2017 | Hedges | G06F 16/367 |
| 2018/0113865 A1* | 4/2018 | Najork | G06F 16/38 |
| 2018/0181750 A1* | 6/2018 | Lamothe-Brassard | G06F 21/552 |

* cited by examiner

DATABASE FOR UNSTRUCTURED DATA

BACKGROUND OF THE INVENTION

Existing systems that use relational databases employ a relational model that typically organizes data into one or more tables of columns and rows, with a unique key identifying each row. However, this relational way of modeling data imposes certain constraints on a system that result in a number of issues, especially in cases where received data has an unknown structure or type and where relationships across pieces of data are unknown, undocumented, or difficult for a person to capture in a consistent or comprehensive manner. In many current applications, providing a response to queries requires an ability to store, access, view, and analyze relationships across pieces of data that are undocumented or not captured by a relational database. For example, in cases where data is received in the form of images related to a product having various attributes, a response to a user query regarding the product requires processing the images to determine a relationship between a perceived equality of images of the product.

Additionally, using a relational model in a business application imposes a framework that requires an understanding of business processes ahead of time. But in many situations, the information regarding relationships across rows of data ahead of time may just not be available or it may be uncertain due to the nature of the relationship. Moreover, as business processes change during the course of data collection and relationships between pieces of data change, the relational model is unable to adapt to capture changing relationships between pieces of data and the uncertainty of those relationships. To compound the problem, some types of information such as attributes of an image are not easy for people to capture and input into a system in a consistent or comprehensive fashion that anticipates which attributes will be relevant to future queries.

Accordingly, a solution is needed that addresses the problem of providing a method and system that can store, manage, and maintain data, including unstructured data of unknown structure or type, as in the case of collecting data in an ever-changing landscape where incoming data is constantly changing, or where relationships across pieces of data are uncertain, unknown, undocumented, or difficult for a person to capture in a consistent or comprehensive manner that anticipates which attributes will be relevant to future queries. Such a solution should also be able to accommodate uncertainty in the data and relationships between pieces of data while providing an ability to query the system and to provide a response that requires accessing, extracting, and analyzing relevant information from the unstructured data.

BRIEF DESCRIPTION OF THE DRAWINGS

Various embodiments of the invention are disclosed in the following detailed description and the accompanying drawings.

DETAILED DESCRIPTION

Figure 1:
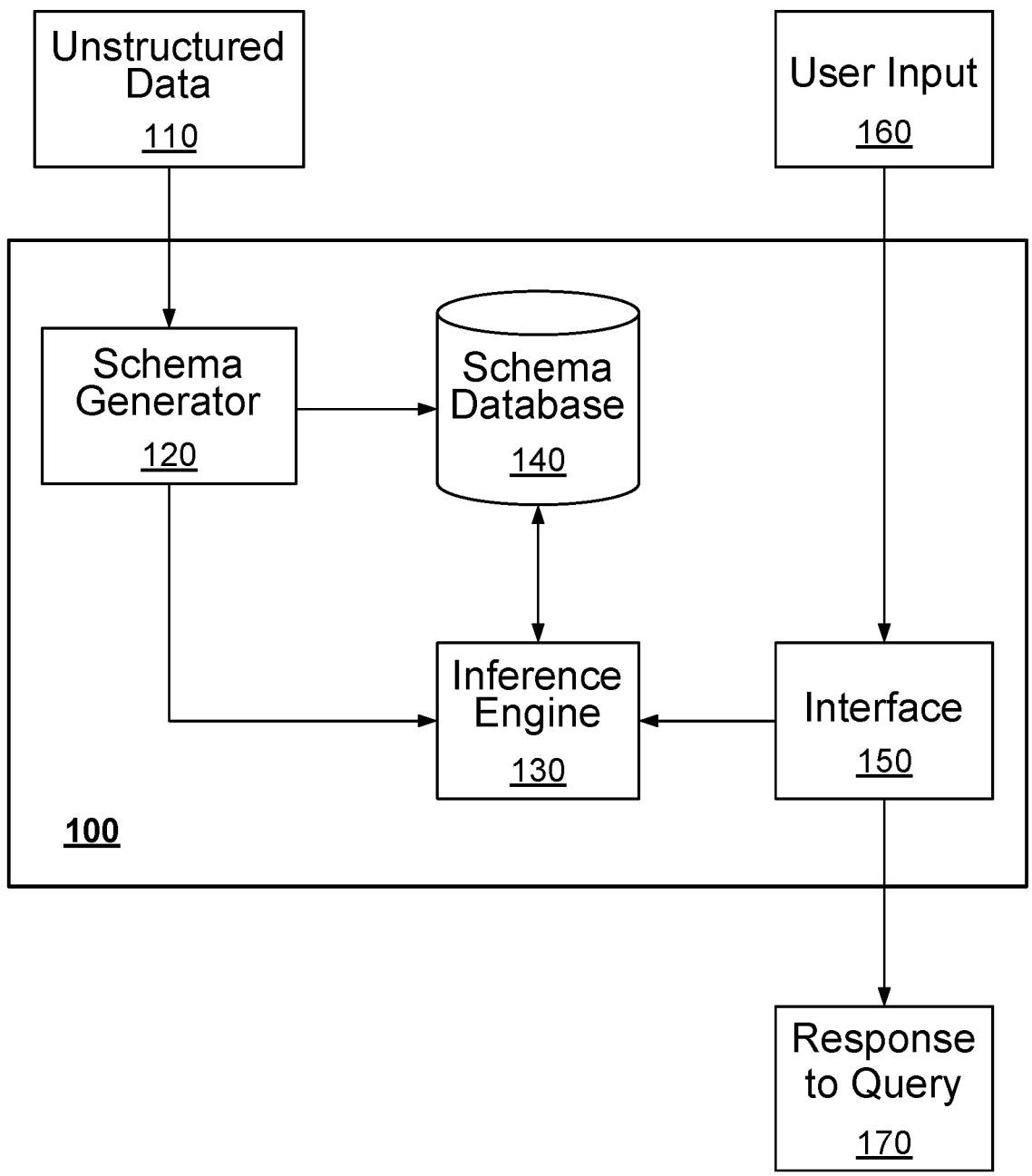
FIG. 1 illustrates an exemplary embodiment of a system for running queries over unstructured data.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A technique for running queries over data is disclosed herein that includes a method and system for storing, managing, and maintaining data, including unstructured data of unknown or unrecognized structure or type and for capturing uncertain relationships between pieces of data. The disclosed technique provides a technical solution for the technical problem of managing unstructured data and uncertain relationships between pieces of data that can evolve as the data and the relationships change over time. In particular, the disclosed method and system provides a construct or a structural description for storing, extracting, and analyzing relevant information from different types of data and data sources, including unstructured data and data that is changing over the course of an application, or where relationships across pieces of data are uncertain, unknown, undocumented, or difficult for a person to capture in a consistent or comprehensive manner. The disclosed system is especially advantageous for running and returning meaningful responses to queries that require an ability to connect pieces of data received from unstructured data or disparate sources, including user input, where the query is directed to information that is uncertain or was not anticipated as useful or relevant at the time the data containing the information was originally generated or received.

Note that the disclosed system is not limited to generating a schema from unstructured data, but can also be applied to data having a known form or structure. In some cases, although incoming data is of a certain type, form, or structure, it may be labeled in a manner that is unrecognizable and is thus treated as unstructured in the sense that the system is unable to recognize its form from its label or from extracted data or metadata.

In some embodiments, a system for running queries over data includes a schema generator configured to generate a schema from data. In some cases, the data is unstructured and the schema comprises a graph having a plurality of nodes and an inference engine configured to infer a structure from the unstructured data by adding a data node or an edge to the schema. The data node or the edge is based at least in part on pieces of data extracted from the unstructured data and the edge represents a relationship between two nodes in the schema. The system further comprises an interface configured to receive a query and to return a query result. The query result is provided by searching the schema and the schema is configured to receive and be modified by user input.

In other embodiments, a method for running queries over data is disclosed that includes generating a schema from data, wherein the schema comprises a graph having a plurality of nodes connected by edges. In some cases, the data is unstructured and the method includes adding a data node or an edge to the schema, wherein the data node or the edge is based at least in part on data extracted from the unstructured data and wherein the edge represents a relationship between two nodes in the schema, searching the schema in response to receiving a query, and returning a query result based at least in part on searching the schema.

FIG. 1 illustrates an exemplary embodiment of a system for running queries over unstructured data. As shown in FIG. 1, a system 100 for running queries over unstructured data comprises a schema generator 120 configured to generate a schema from unstructured data 110. Here, the schema comprises a graph having a plurality of nodes and an inference engine 130 configured to infer a structure from the unstructured data by adding a data node or an edge to the schema. In some cases, the data node or the edge is based at least in part on data extracted from the unstructured data and the edge represents a relationship between two nodes in the schema. System 100 also includes a schema database 140 for storing data (e.g., the schema) and an interface 150 configured to receive a query and to return a query result, wherein the query result is provided by searching the schema. In some instances, the query is received by the system 100 via the interface 150 as user input 160 and the query result is provided as a response to the query at 170. Additionally, in some cases, the schema is configured to receive and be modified by user input 160. As will be discussed in more detail below, user input includes user interactions and feedback received by the system via interface 150.

Figure 2:
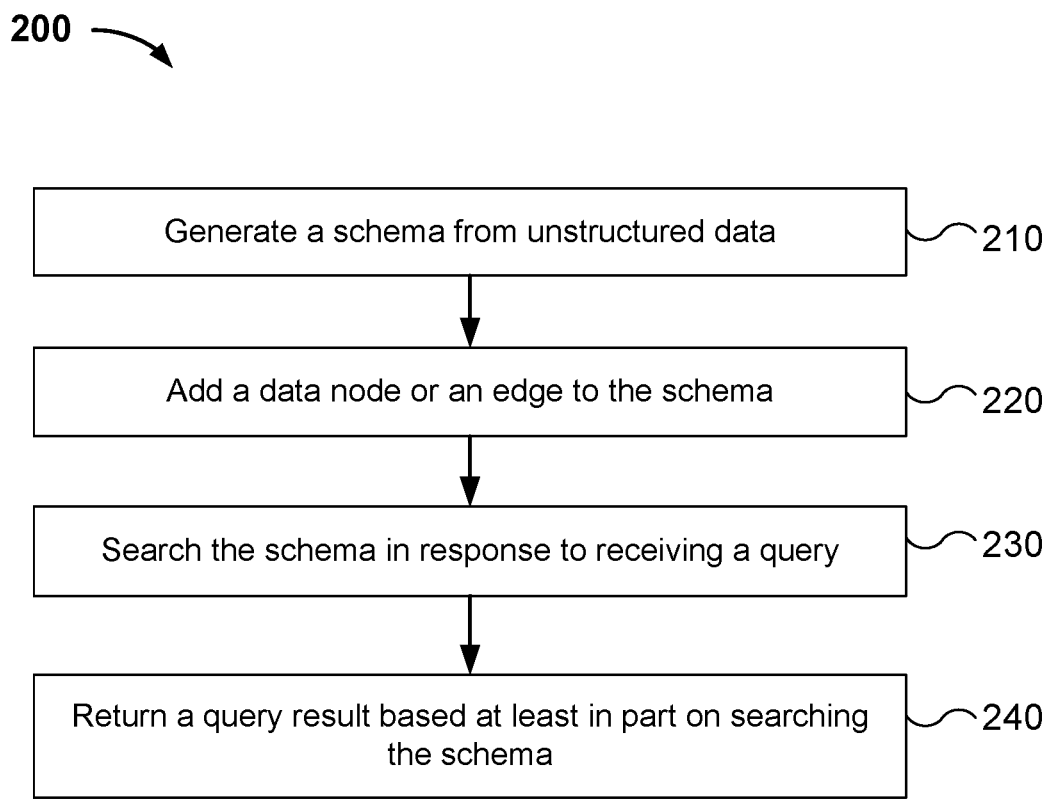
FIG. 2 illustrates an exemplary embodiment of a method for running queries over unstructured data that can be performed by the system of FIG. 1.

FIG. 2 illustrates an exemplary embodiment of a method for running queries over unstructured data that can be performed by system 100 of FIG. 1. As shown in FIG. 2, a method 200 for running queries over unstructured data includes generating a schema from unstructured data at 210. The schema comprises a graph having a plurality of nodes connected by edges. At 220, the method includes adding a data node or an edge to the schema, wherein the data node or the edge is based at least in part on data extracted from the unstructured data and wherein the edge represents a relationship between two nodes in the schema. As shown in FIG. 2, the method 200 also includes searching the schema in response to receiving a query at 230 and returning a query result based at least in part on searching the schema at 240.

Unlike existing techniques that rely on a relational database model, the solution embodied in the exemplary system and method as described in FIGS. 1 and 2 enables marketing organizations to ingest and manage large volumes of unstructured data and other types of data including images, video content, and metrics pulled from social media applications, and other situations where incoming data from various sources is constantly changing and where inventory information and processes on the marketing side are in a state of flux. In particular, the disclosed system is configured to ingest large volumes of data, including unstructured data, regardless of its structure, type, or form by storing the data as a node in a graph. In this manner, an inferred structure is generated from the data, which is represented by nodes in a graph that can be connected by edges that represent relationships between the nodes.

In some embodiments, a node represents a data entity or container of data. In some cases, a node is a container for all bits of information that are linked only to that container (e.g., an image node is a container that contains the image bytes, because the image bytes are the only bits of information linked or attached to that container). In some cases, nodes are generated depending on how a user chooses to model data or capture data. For example, data can be modeled based on ingestion patterns, for instance, by tying or associating a node to its ingestion time or where nodes are defined by the pieces of data that are ingested at one time.

In some applications, incoming datasets are received at different speeds or rates resulting in parallel streams of data that are ingested by the disclosed system. For example, in one application, SKU information gets updated every hour while images get updated every second. These two different streams, one coming in every hour and the other every second are managed by generating two distinct sets of nodes. For example, product data (with SKU and inventory information) is coming in from a system in a continuous way and separately the image information is coming in from an alternative system. In this case, the disclosed system is configured to ingest data received from these parallel data streams generated by disparate sources and to infer associations between data extracted from each source and represented as nodes.

In some embodiments, a node is an entity containing structured data and a semi-structured schema or set of data. In some cases, a node contains some unstructured data and some semi-structured data. For example, a structured part might include a key value JSON object, and an unstructured part might consist of a set of bytes from an image file.

Although some minimum set of node types are prevalent or understood, such as an image, the full domain is open and the set of node types is unbounded. Moreover, nodes in a graph do not always have to be linked to other nodes by edges. In some cases, an unlinked node exists and is stored as part of a graph with no connections to any other nodes. Accordingly, a query that initiates a search over nodes in a graph or structured schema will include any unlinked nodes having no connections to any other nodes in the graph.

In contrast to a relational model, in a graph model or construct, new information that includes unstructured data or changing data does not require changing a previous structure, but only requires adding new nodes to the current structure, which in this case is the current graph. Accordingly, in complex systems, ingested data regardless of its form or structure can be stored and represented as nodes to generate a graph or can be added as nodes to an existing graph. These nodes can be linked or connected by edges that represent relationships between the nodes in the graph. In this manner, graphs are built around objects in applications (e.g., business objects in a business application) that matter the most for a given application and that enable questions or queries to be asked that require accessing and analyzing image and video assets in relation to other business objects.

In this approach, data or observations that do not change (i.e., data that cannot be re-generated from something else) form a base representation in the schema. Building on top of that base representation are inferences made by the system in the form of inferred nodes and inferred edges added to the graph. This technique enables the disclosed system to manage unstructured data and uncertain relationships between pieces of data in a construct or structural schema that can be queried to provide a response that requires being able to store, access, extract, and analyze relevant information from unstructured data, including incoming data for an application that changes over the course of the application or where relationships across pieces of data are uncertain, unknown, undocumented, or are difficult for a person to capture in a consistent or comprehensive manner that anticipates what information will be relevant in future queries.

In some cases, the graph as described herein has predefined relationships that are represented as edges between certain nodes. The disclosed system (e.g., system 100 of FIG. 1) ingests unstructured data, generates a schema comprising a graph having a plurality of nodes, and infers a structure from the unstructured data by adding a data node or an edge to the schema (e.g., via inference engine 130 of FIG. 1).

In some embodiments, an edge between two nodes represents an inferred relationship that has an associated confidence level indicating an estimated probability, likelihood, or confidence in the validity of the relationship. This framework, whereby edges are generated to define a relationship between two pieces of data as captured by two nodes, enables the system to capture uncertainty in relationships between or among pieces of data via a confidence level, estimated probability, or likelihood associated with each edge.

In some embodiments, an inferred node or edge is an output of a function or model such as a machine learning model and represents an estimate or the system's best guess or prediction of a desired result. In some cases, the inference mechanism includes a plurality of models which are used to infer nodes and edges between nodes. For example, a model or a plurality of models are applied to generate or determine a confidence level for an edge inferred from user input based on, for instance, the user's historical performance.

In some cases, the process of determining an inference or series of inferences from received data (e.g., unstructured data) to generate a schema happens asynchronously. In particular, at the time incoming data is stored in the system (e.g., as nodes in a graph), the incoming data may be unstructured and include incorrect, incomplete, or missing data. In contrast to relational databases, the disclosed system is configured to manage this uncertainty in unstructured data, including incorrect, incomplete and missing data, by inferring a provisional structure and generating a schema that captures uncertainty in the data in a form or construct that can be queried. The schema that is generated over unstructured data is a provisional structure that is uncertain in the sense that it includes data that may be incorrect, incomplete, missing, or have some unknown attributes (e.g., an unrecognized or unidentifiable type) that the system cannot classify at the point in time the data is received.

Thus, the disclosed technique differs from existing and prior systems that commit to an inflexible structure such as a relational model, where data that is present in the relational database is deterministic and must be taken as is. This relational model approach is infeasible for unstructured workloads where information about what is correct and incorrect is something that arrives via feedback over time and where the relational model is unable to change or evolve its structure to accommodate this feedback.

In contrast, the disclosed method and system merge techniques such as machine learning and database technology to support a notion of a database for unstructured data based on generating a provisional structure representing the current state of the data in whatever form the data was received. This provisional inferred structure or schema provides an ability to run queries over unstructured data and can be modified and improved based on feedback and other data from disparate sources that can be used to supplement and correct previous inferences to the current state of data as it exists in the system. In particular, in response to queries over this data, the system performs a search over the data in whatever state it happens to be at the time the query is received. A benefit of the disclosed technique is that the user can drive feedback which creates new data that can be ingested and used to inform the current state of the graph. Based on user input and other data subsequently received from various disparate sources, the disclosed system can make new inferences to update the graph and correct or fill in gaps in the state of the data as represented in the current state of the graph.

As described above, the disclosed technique of inferring structure from unstructured data to represent a business process is very different from the way existing techniques represent traditional systems in an ERP context. In particular, the disclosed method allows for the representation of data to evolve over time and for people to input incomplete information. Incoming data, including unstructured data, is ingested by the system and stored in a schema comprising a graph, which is an evolving description that is configured to be changed or modified based at least in part on user input. Moreover, user input (e.g., in the form of user interactions with the system via an interface) can be captured by generating additional nodes or edges that are added to the graph.

Data represented in the graph construct or structural schema as described herein includes evidence such as an actual image, text, or other representation of information, and observations, which include human or user input in response to an event. In some cases, the system is configured to recognize and process two kinds of observations or events (1) incoming data or datasets received or ingested by the system, and (2) a user input or user interaction. The processing of incoming data or datasets is described in some detail with respect to FIGS. 1 and 2 above. The processing of a user input or user interaction will now be described with respect to FIG. 3 as follows.

Figure 3:
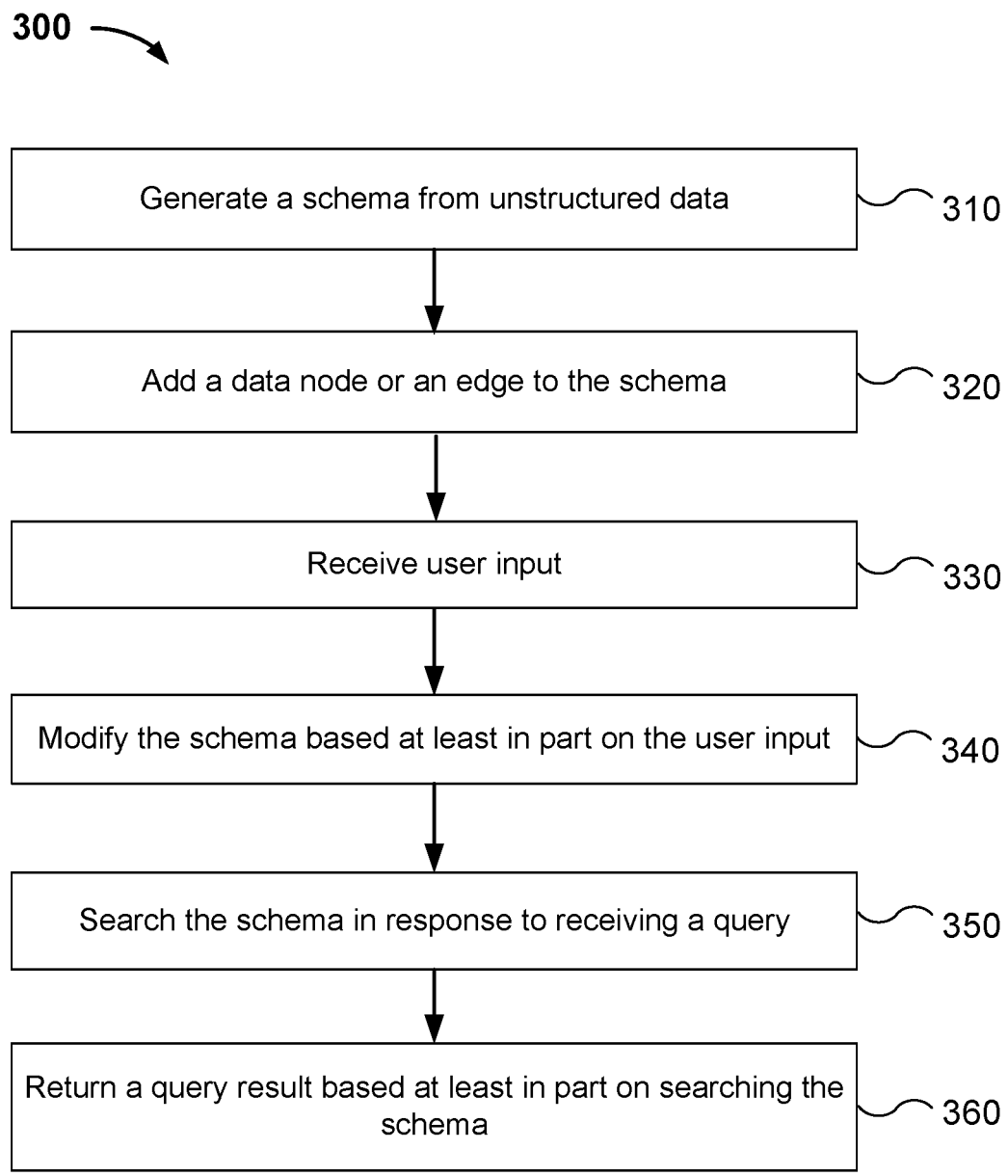
FIG. 3 illustrates an exemplary embodiment of a method for running queries over unstructured data that includes receiving user input and modifying the schema based at least in part on the user input.

FIG. 3 depicts an exemplary embodiment of a method for running queries over unstructured data that includes receiving user input and modifying the schema based at least in part on the user input. As shown in FIG. 3, a method 300 for running queries over unstructured data includes generating a schema from unstructured data at 310, wherein the schema comprises a graph having a plurality of nodes connected by edges. At 320, the method includes adding a data node or an edge to the schema, wherein the data node or the edge is based at least in part on data extracted from the unstructured data and wherein the edge represents a relationship between two nodes in the schema. At 330, the method includes receiving user input including for example, user interactions with the system via an interface (e.g., interface 150 of FIG. 1). At 340, the method includes modifying the schema based at least in part on the user input. As in the exemplary method of FIG. 2, method 300 of FIG. 3 also includes searching the schema in response to receiving a query at 350 and returning a query result based at least in part on searching the schema at 360.

In some embodiments, data is received from various sources, including for example from a human user (e.g., user input at 160 of FIG. 1), and the system is configured to ingest data from these various sources, store pieces of ingested data as nodes, and infer associations between the pieces of data. In some cases, data that is coming in from a user is not modified by the system. Rather, as discussed in further detail below, the system is configured to modify confidence levels or probabilities associated with relationships and properties that are inferred about the incoming data. In some instances, the data stored as a node in the graph is also indexed in order to be accessed by the system during a query.

Figure 4:
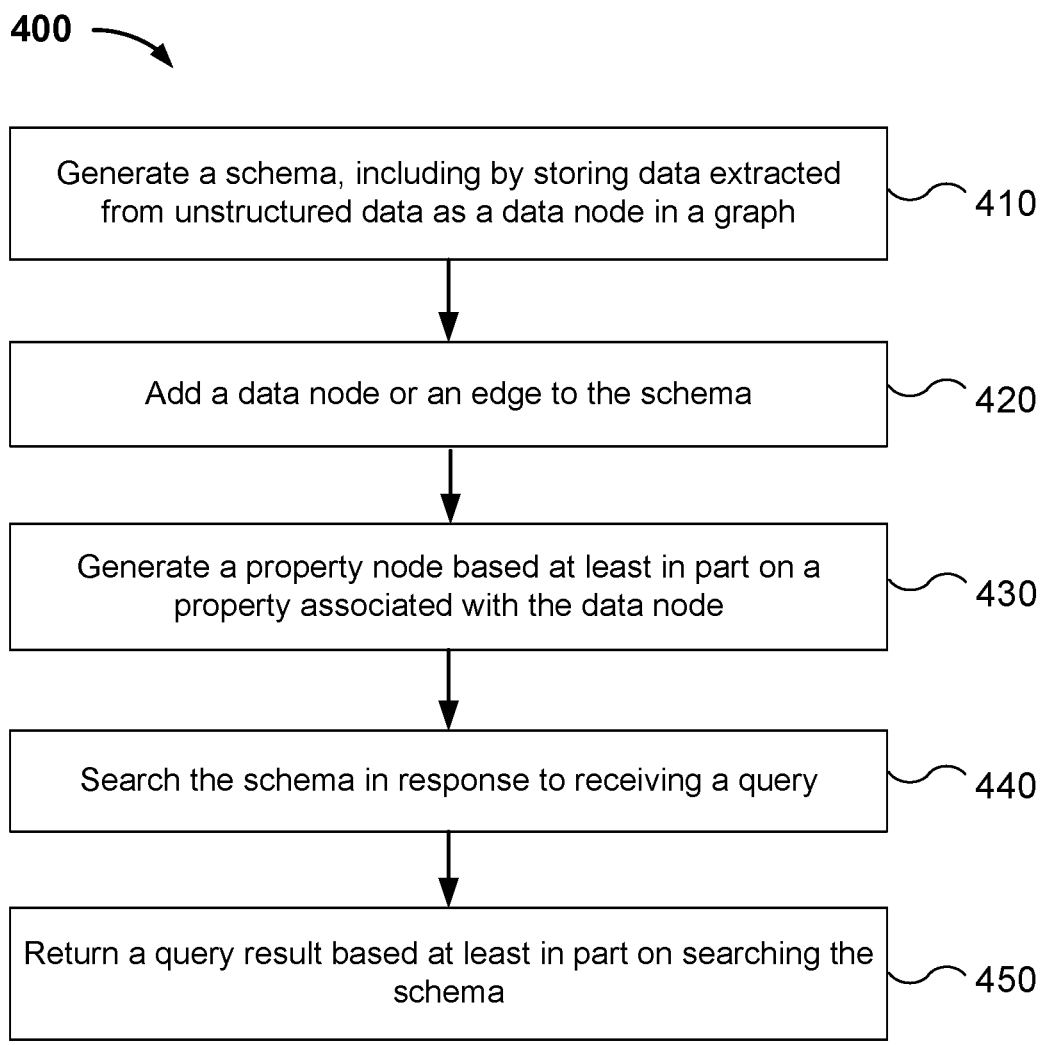
FIG. 4 illustrates an exemplary embodiment of a method for running queries over unstructured data that includes generating a property node based at least in part on a data node.

In some cases, putting a structure on unstructured data includes parsing, breaking down, or decomposing the unstructured data into pieces and associating properties, represented by additional nodes such as property nodes, with the pieces of data. For example, as shown in FIG. 4, an exemplary embodiment of a method 400 for running queries over unstructured data includes generating a property node based at least in part on a data node. In the example shown, a schema is generated from unstructured data at 410, wherein the schema comprises a graph having a plurality of nodes connected by edges. At 420, the method includes adding a data node or an edge to the schema, wherein the data node or the edge is based at least in part on data extracted from the unstructured data and wherein the edge represents a relationship between two nodes in the schema. At 430, the method includes generating a property node based at least in part on a property associated with the data node. Finally, the method 400 includes searching the schema in response to receiving a query at 440 and returning a query result based at least in part on searching the schema at 450.

Figure 5:
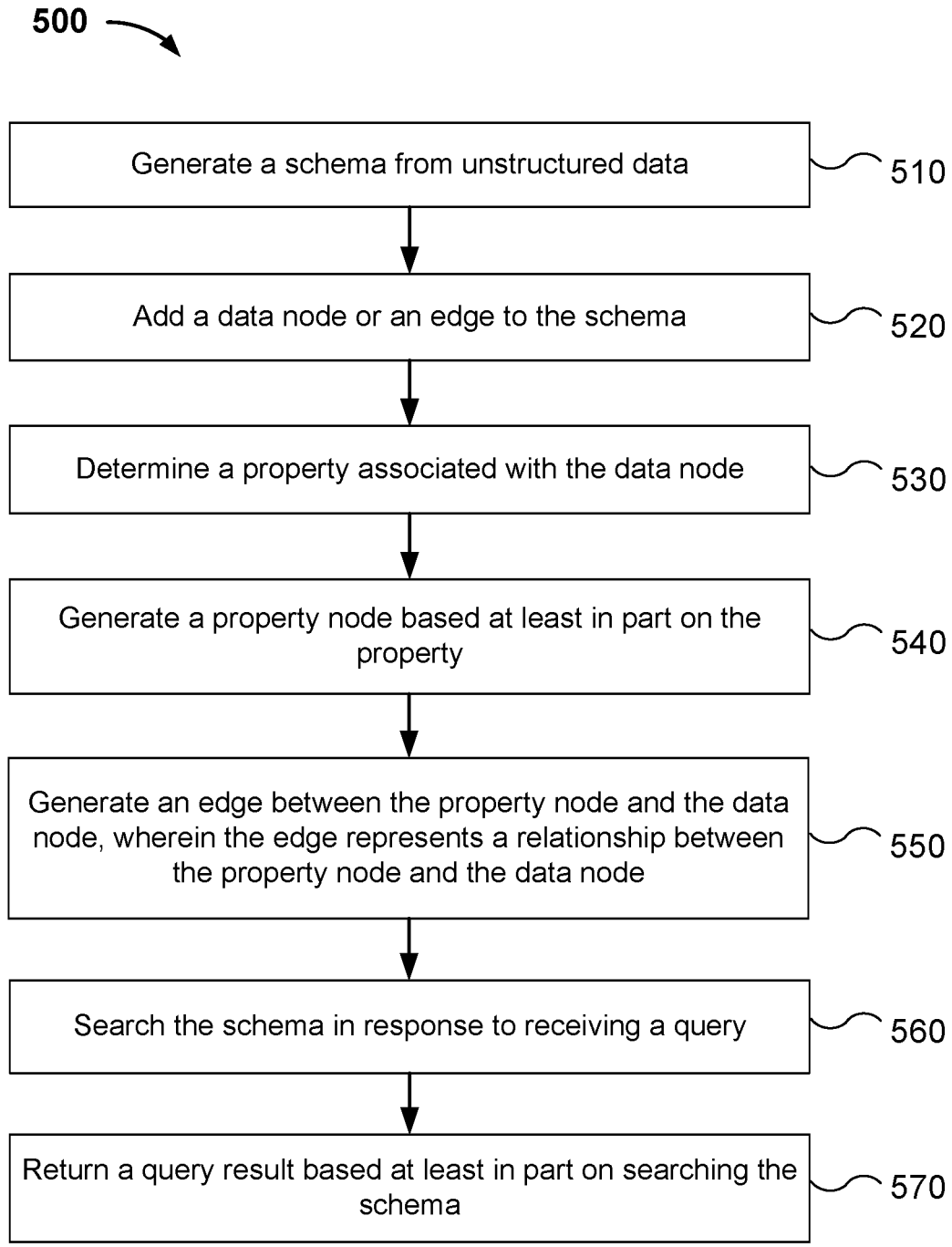
FIG. 5 illustrates an exemplary embodiment of a method for running queries over unstructured data that includes determining a property associated with a data node, generating a property node, and generating an edge between the property node and the data node.

Additionally, as shown in FIG. 5, an exemplary embodiment of a method 500 for running queries over unstructured data includes determining a property associated with a data node, generating a property node, and generating an edge between the property node and the data node. In the example shown, a schema is generated from unstructured data at 510, wherein the schema comprises a graph having a plurality of nodes connected by edges. At 520, the method includes adding a data node or an edge to the schema, wherein the data node or the edge is based at least in part on data extracted from the unstructured data and wherein the edge represents a relationship between two nodes in the schema. At 530, the method includes determining a property associated with the data node. At 540, the method includes generating a property node based at least in part on the property associated with the data node. At 550, the method includes generating an edge between the property node and the data node, wherein the edge represents a relationship between the property node and the data node. Finally, the method 500 includes searching the schema in response to receiving a query at 560 and returning a query result based at least in part on searching the schema at 570.

As an example of how a property associated with the data node is determined as shown in FIG. 5 and how an additional node such as a property node is generated based at least in part on the property as shown in FIGS. 4 and 5, suppose that incoming data is received in the form of a presentation that includes a number of slides. The presentation may be stored in the schema as a presentation data node in a graph. After parsing or breaking down the presentation, the system determines that a property of the presentation is that it consists of a number of slides. Each slide in the presentation is then stored separately as a property node connected by an edge to the presentation data node. Each property node is thus a representation of a piece of data ingested by the system.

The extraction of pieces of data can continue depending on the application. In this case, each slide in the presentation can be parsed or broken down to determine properties of the slide. For example, each slide can include text, or a picture or an image having various additional information that can be extracted or processed to provide a response to a particular query. Here, a picture or image from a slide is processed to determine whether a particular person or object is present, and various attributes of the person or object are extracted. Each time a piece of data or information (e.g., a property) is extracted from an existing node, the extracted piece of data or information can be stored as another distinct node (e.g., a property node of the original node from which it is derived). In this case, a node associated with a slide (e.g., a slide node) in the presentation contains an image which is represented by the system as another node (e.g., an image node) having an edge linking back to the slide node. The edge represents that the image node and slide node are related (in this case, the edge represents that the system recognizes that the slide contains an image).

Other examples of properties, associated information, or attributes extracted from data or a piece of data include identification numbers for products or inventory such as an SKU or style variant. In some cases, these properties, associated information, or attributes are referenced by data or metadata stored as additional property nodes in the graph and the system can make inferences to link a property node representing a property such as an identification number to a new node generated from newly ingested data. For example, in the case of an image from a slide in a presentation where the image contains an object associated with an identification number, each piece of data or extracted information—the presentation, the slide, the image, the object, and the identification number—is represented as a node in the graph. Thus, once an incoming dataset (e.g., a presentation or set of presentations) has been ingested by the system and extracted pieces of data are stored as nodes in the graph, a response can be provided to a user input consisting of a query based on the current graph state.

Building on the example described above, a user might want to know how frequently two particular identification numbers appear together or how often two particular products associated with the two particular identification numbers appear together. This question is input in the form of a query which is received and processed by the disclosed system. Based at least in part on the user input, which in this case is in response to the query, the system is configured to make inferences to inform a response to the query. For instance, the system can infer that the two products in question appear together in an image, even in the case where the original image is not identified with either product labels or product identification numbers. The inference is based on previous data in the system, existing and stored as nodes, and the relationships between the nodes that inform the system. In this case, previous data includes nodes that represent each of the two products in question, with edges connecting or linking each product node to an ID node representing each product's respective identification number.

Returning to the system 100 of FIG. 1, in some embodiments the inference engine 130 includes a content detector (not shown) configured to perform a content detection phase to determine a property associated with the data node (e.g., as shown in the exemplary method 500 of FIG. 5). In some cases, the property is a data type and the content detector is configured to apply a model to the data node to determine a data type associated with the data node. In some examples, after received data or an incoming dataset is stored as a node in the graph, data is extracted from the received data or incoming dataset and processed by the system (e.g., by extracting relevant data, or by parsing or breaking down the data or dataset into pieces of data). The system then applies an inference or prediction mechanism such as a predictive model (e.g., a heuristic rule or a machine learning model) to the processed data to determine a data type associated with the data node.

In some embodiments, content detection is ongoing and the data type can change over time. In some cases, an initial inference as to the data type associated with a data node may be changed or revised based at least in part on or in response to receiving user input or user feedback.

In some instances, the inference or prediction mechanism for the content detection phase includes a plurality of models, for example, a series of heuristics to infer file formats to determine a data type. In other cases, the disclosed method also includes a normalization phase in order to extract key information from data having the same data type but different file formats. For example, in the case where incoming data includes images having different file formats, the normalization phase extracts out the appropriate image data and other available metadata and stores these pieces of data as nodes in the graph.

As an example of the content detection phase in the method as disclosed herein, in the case of a presentation that includes a number of slides, after storing the presentation as a node in the graph (e.g., a presentation node), the content detector determines a data type associated with the presentation node (e.g., data type=PowerPoint) and stores the data type as its own node (e.g., a PowerPoint node). The original data node (e.g., the presentation node) is then linked via an edge to its associated data type (e.g., the PowerPoint node). Note that the method as described above to perform content detection on received data can be subsequently applied to other incoming data or datasets that are processed by the system and added as nodes in the graph and can be linked via an edge to the data type (e.g., the PowerPoint node) in the case where the system determines that the received data is in the form of a PowerPoint presentation. The system can also be configured to identify other data and can even generate new data types if the data type of the received dataset is unknown or does not exist in the current graph.

Continuing with the example above, in some cases other types of files such as images are embedded in Power Point presentations or the presentations have pointers to images. In these cases, each image has metadata that the system can infer from extracting and analyzing the image (e.g., an image has implicit attributes such as the color orange). For instance, a set of inferences for an image can include attributes such as color, a fashion model name, or a product identifier or may include bullets or bullet points that are parsed by the system. In some cases, the system stores extracted metadata as nodes in the graph, where nodes in this case represent attributes or observations tied to the image, which itself is stored as a node. In the case where nodes and edges between nodes are inferred by the system (e.g., the color orange, and the strength of the relationship between the image and the color orange), user input in the form of feedback that is received regarding the inferences made by the system is used as evidence to improve those inferences. For example, if user input indicates that the image also contains the color green, the system generates an inferred node associated with the color green (e.g., a green node) and an inferred edge linking the image node to the green node.

In this manner, the disclosed system maintains clear notions of classifications or types that extend to all data extracted or derived from a received dataset. Specifically, received or incoming data may be a certain file type, wherein the file type expresses a certain type of content (image, audio, document, video, etc.), and wherein within a given type of content such as an image there are notions of properties or attributes such as colors, or a notion of a slide. A slide can contain multiple images or text, wherein the text can be an expression of a reference to a color or to a product. In each case, an inference mechanism such as a model or a plurality of models is applied to extract each notion of a classification or type and to proceed from one type to another type, whether it be from an image to a color or product, or from text to bullets to products. In this manner, the system receives incoming data as bytes and the inference engine incrementally extracts semantic value out of the incoming data to produce a structure or extracts some inferred structure that is modified and enriched by user input and feedback over time.

In some embodiments, at any given point in time, the generated schema represents an approximation of a current state of data that has been ingested by the system and represented in the schema. In this framework, the system receives user input including user interactions and user feedback, and uses the user input to inform the inference engine in order to make inferences regarding pieces of data and relations between pieces of data. In some cases, user input is used by an inference or prediction mechanism (e.g., models including heuristics and machine learning models) to generate inferences from the data.

The generated schema as described herein is configured in some embodiments to evolve over time. Specifically, inferences change (e.g., resulting in a change to an inferred edge representing the strength or validity of a relationship between nodes) in response to incoming data that is ingested. Additionally, the system learns about other kinds of metadata and incorporates the metadata into the schema. In some cases, user input drives feedback into the system, including by informing inference or prediction mechanisms such as predictive models (e.g., heuristics and machine learning models) used to make inferences regarding nodes and edges.

In some cases, every step or observation is saved or stored by the system for future access. For example, in the case where incoming data includes an original image stored as a data node in the graph, the data node has edges to observations, which are also stored as nodes and edges to inferred nodes. In this approach, data or observations that do not change (i.e., data that cannot be re-generated from something else) form a base representation in the graph and inferences made by the system are built on top of that base representation as inferred nodes and inferred edges. For instance, taking an image consisting of one picture with one item where user input is received regarding the picture, the user input is processed into pieces of data and each piece of data is treated as a clear atomic observation that is stored as a node, where each node in this case is linked to the image via an edge in the graph. This approach is depicted and described in further detail with respect to FIGS. 6 and 7.

Figure 6:
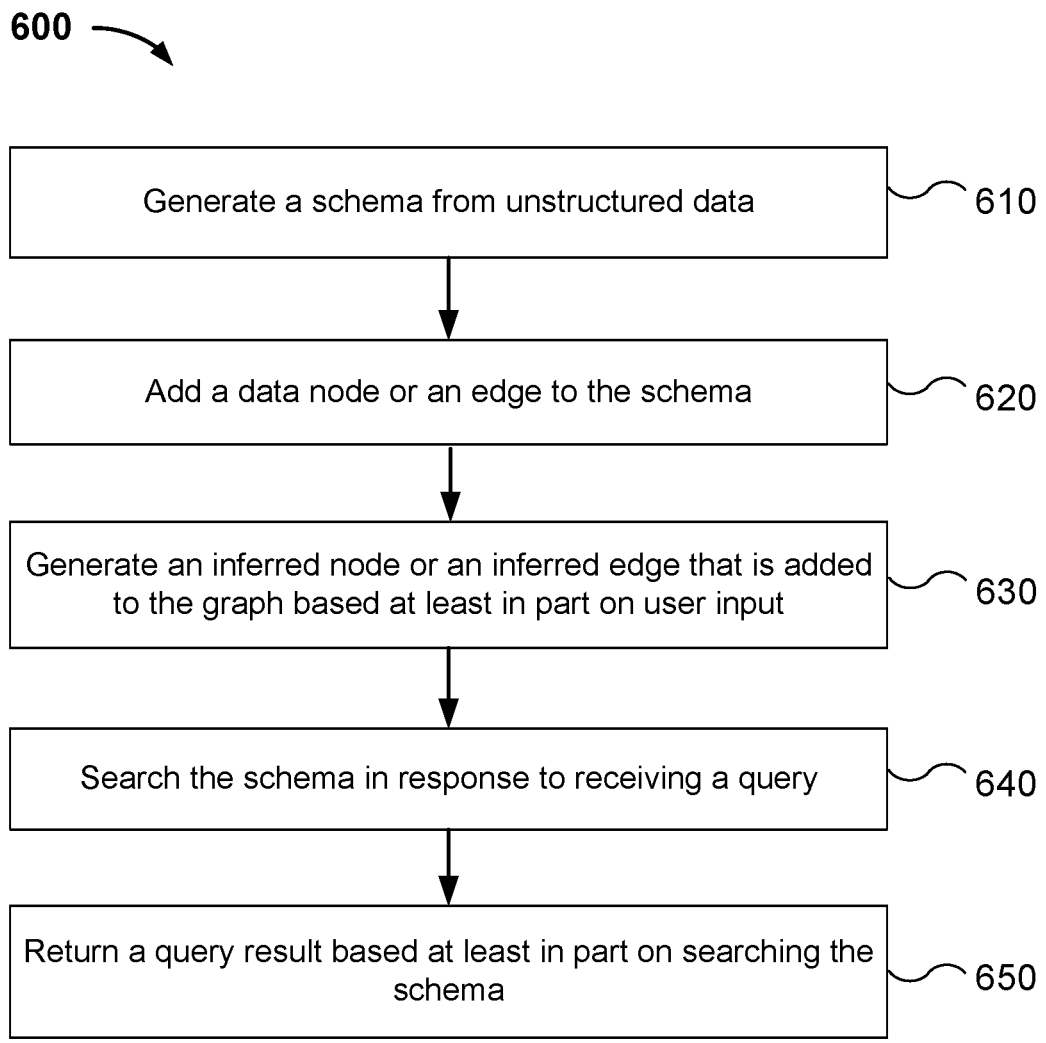
FIG. 6 illustrates an exemplary embodiment of a method for running queries over unstructured data that includes generating an inferred node or an inferred edge that is added to the graph based at least in part on user input.

Specifically, as shown in FIG. 6, an exemplary embodiment of a method 600 for running queries over unstructured data includes generating an inferred node or an inferred edge that is added to the graph based at least in part on user input. In the example of FIG. 6, a schema is generated from unstructured data at 610, wherein the schema comprises a graph having a plurality of nodes connected by edges. At 620, the method includes adding a data node or an edge to the schema, wherein the data node or the edge is based at least in part on data extracted from the unstructured data and wherein the edge represents a relationship between two nodes in the schema. At 630, the method includes generating an inferred node or an inferred edge that is added to the graph based at least in part on user input. Finally, the method 600 includes searching the schema in response to receiving a query at 640 and returning a query result based at least in part on searching the schema at 650.

In some embodiments, a confidence level or estimated probability is determined and associated with an edge, wherein the confidence level or estimated probability is indicative of the strength or validity of the relationship between the two nodes connected by the edge. In some cases, the confidence level ranges from 0% (indicating no relationship) to 100% (indicating a definite relationship). Alternatively, an estimated probability ranges from 0 (indicating no relationship) to 1 (indicating a definite relationship). For example, returning to the case described above of a presentation consisting of a number of slides, each slide having an image, because the image is extracted directly from the slide, the edge linking the slide node to the image node is associated with a confidence level of 100% or an estimated probability of 1.

Figure 7:
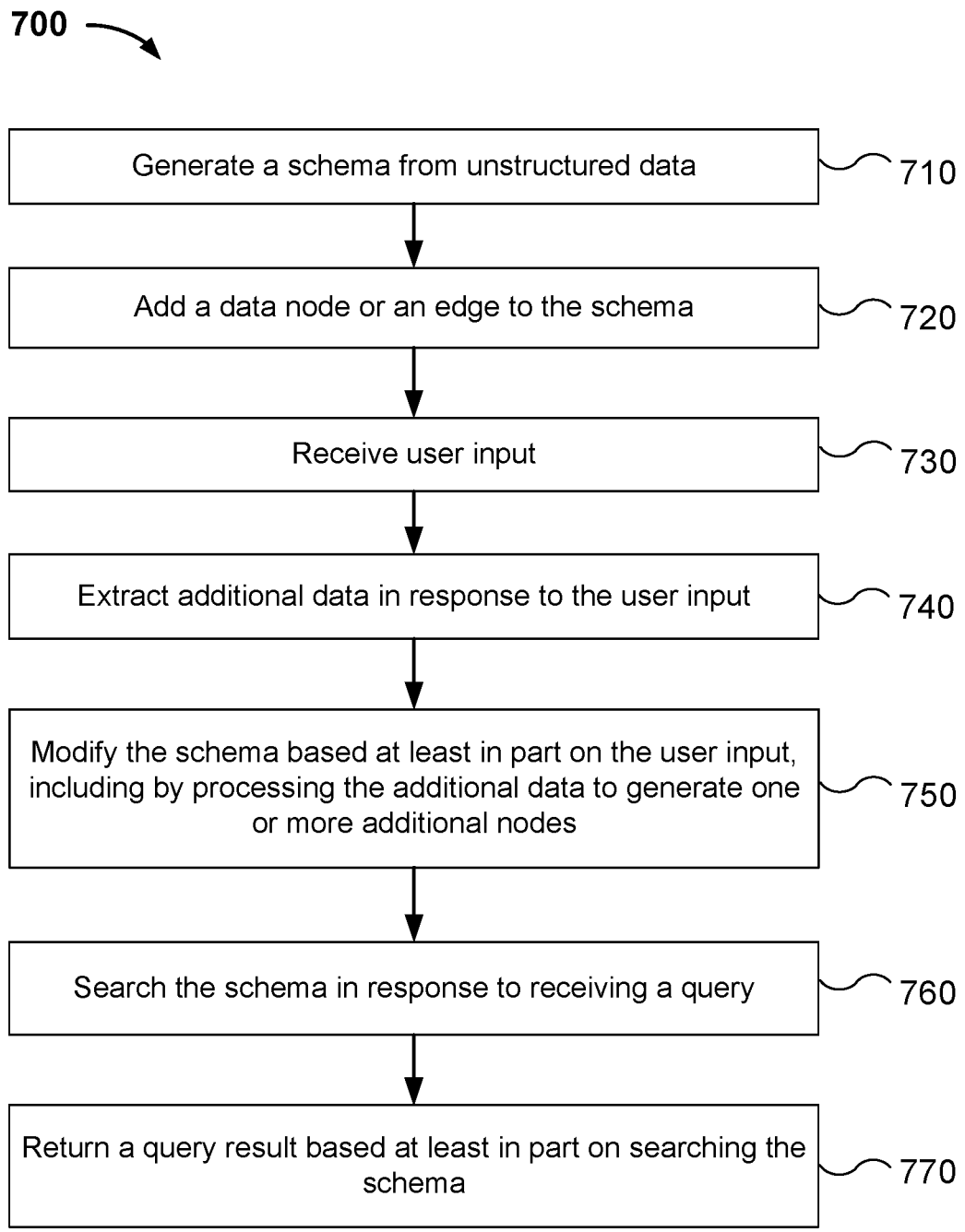
FIG. 7 illustrates an exemplary embodiment of a method for running queries over unstructured data that includes receiving user input, extracting additional data in response to the user input, and modifying the schema based at least in part on the user input.

In some examples, as shown in FIG. 7, an exemplary embodiment of a method 700 for running queries over unstructured data includes receiving user input, extracting additional data in response to the user input, and modifying the schema based at least in part on the user input, including by processing the additional data to generate one or more additional nodes in the graph. In particular, at 710, the method 700 includes generating a schema from unstructured data, wherein the schema comprises a graph having a plurality of nodes connected by edges. At 720, the method includes adding a data node or an edge to the schema, wherein the data node or the edge is based at least in part on data extracted from the unstructured data and wherein the edge represents a relationship between two nodes in the schema. At 730, the method includes receiving user input including for example, user interactions with the system via an interface (e.g., interface 150 of FIG. 1). At 740, the method includes extracting additional data in response to the user input. At 750, the method includes modifying the schema based at least in part on the user input, including by processing the additional data to generate one or more additional nodes in the graph. In some cases (not shown), the method includes modifying the schema based at least in part on the user input, including by processing the additional data to generate or revise one or more edges in the graph. Finally, the method 700 includes searching the schema in response to receiving a query at 760 and returning a query result based at least in part on searching the schema at 770.

As described above, the disclosed system is configured to receive and store unstructured data from various sources including user input, to add structure to the unstructured data by storing pieces of data as nodes, wherein relationships between nodes are captured by edges having a confidence level, and to provide a mechanism of actively feeding back responses from users that changes relationships that have been previously captured. In some cases, the system receives and incorporates feedback from a user in the form of a user input by modifying the schema based at least in part on the user input (e.g., as shown in FIG. 3), including for example by generating an inferred node or an inferred edge that is added to the graph based at least in part on user input (e.g., as shown in FIG. 6), and by extracting additional data in response to the user input and processing the additional data to generate one or more additional nodes in the graph (e.g., as shown in FIG. 7).

In some cases, feedback is used to generate new entities or to move entities around (e.g., nodes or edges) in the graph and can be applied to the content detection phase described above. In particular, the system is configured to change the data type or content type based at least in part on or in response to feedback or interaction from a user. For example, suppose a number of image files with an extension ".blob" are received and ingested by the disclosed system. If a user subsequently accesses the files and provides feedback to the system via a user input or user interaction that the files are image files, the inference engine can use the feedback as evidence to infer that a file having the extension ".blob" means that the file is an image file. Moving forward, at least based on the feedback received thus far, the inference engine will infer that files provided in a same or similar context (e.g., files uploaded by the same user that uploaded the previous files having ".blob" as an extension from a particular organization) are image files. Additionally, the inferences can be made over newly uploaded files having the extension ".blob" files, or files having the extension ".blob" that are already stored in the schema.

Continuing this example, suppose incoming data now includes audio files having the extension ".blob" and the system, based on previous feedback, infers that the audio files are image files. After accessing these files, a subsequent user provides feedback to the system that the files are not image files as the system has inferred, but are in fact audio files. The system can now use this new feedback to adjust future inferences regarding files having the extension ".blob" by, for example, using additional information or metadata extracted from the files to determine the data type.

In this case, the system adjusts the inference or prediction mechanism (e.g., heuristics or machine learning model). In some cases, machine learning techniques are used to infer a set of heuristics. In other cases, the inference engine is configured to make an inference or prediction and based at least in part on or in response to user feedback, is configured to either add a node or change or add an edge to the graph.

In this particular example, suppose an existing set of nodes for the file types "image" and "audio" already exist and are stored in the schema. In response to the user feedback that the newly received files are audio files and not image files as previously inferred, the system changes the edge linking the data node corresponding to the received audio file to the "image" file type node to the "audio" file type node. Alternatively, in the case where the incoming data includes files having a new file type not currently existing in the system as a file type node, the system creates a new file type node corresponding to "newfiletype." Here, each edge has a confidence level or estimated probability representing the strength or validity of the inference. In some cases, the confidence level or estimated probability is adjusted by the inference mechanism (e.g., heuristics or machine learning model). In some cases, the inference mechanism maintains inferences or predictions independently from the graph and updates the graph according to the inferences and estimated probabilities. In some applications, the system is configured to assume that explicit user feedback for a given user is correct with a confidence level of 100% or an estimated probability of 1.

Note that user feedback can be implicit or explicit. In particular, the disclosed system (e.g., via the interface 150 of FIG. 1) can prompt a user for information in order to obtain explicit feedback, or a user may interact with the system to provide implicit feedback.

As an example of how the disclosed system receives and incorporates feedback from a user in the form of a user input by modifying the schema, suppose a first user viewing images on the system is prompted to answer a question regarding the color of a shirt in a particular image being displayed by the system. The prompt may be in the form of an input field that accepts a typed response, or in the form of selection boxes that allow a user to choose or select a particular color from a list of pre-determined color options. The system receives input from the first user that the shirt in question is a particular color, for example, orange. The system stores the shirt as a node, and the color orange as a node, and connects the two nodes with an edge representing the first user's explicit feedback that the shirt in the image is orange in color. In this manner, the system has generated an inferred node (e.g., the color orange) that is added to the graph based at least in part on user input (the first user's input that the shirt is orange in color), and an inferred edge (e.g., the edge connecting the shirt node and the node representing the color orange).

In some cases, because the first user's input is an explicit observation by the first user that the color of the shirt in the image is orange, the edge linking the shirt node to the orange node is assigned a confidence level of 100% or an estimated probability of 1, in response to or based at least in part on this positive explicit feedback from the first user. This represents that, with no other information other than the feedback from the first user, the system has inferred that the shirt in the image is orange with 100% confidence.

As an example of implicit feedback, suppose in the example described above that a second user enters a query via the interface asking for the system to search and return a display of all images having the color orange. In this example, suppose that the image of the shirt viewed by the first user is returned and displayed as the third image in response to the second user's query. If the second user, after having input a query requesting for all images with orange, subsequently selects or clicks on this third image (the image of the shirt identified as orange in color by the first user), this interaction will be received by the system as positive implicit feedback from the second user, reinforcing the system's initial estimation (e.g., the confidence level of 100% or estimated probability of 1) that the shirt is orange in color.

Continuing with this example, suppose now that the system elicits a second opinion from a third user by prompting the third user to respond to a direct question asking the third user as to whether the color of the shirt in the image is orange. In this case, the third user contradicts the first and second users by indicating that the color of the shirt is not orange, but is red. In this case, the system may re-evaluate its estimation of the confidence level associated with the edge currently linking the shirt node to the orange node. One possible outcome, depending on the inference mechanism, is that the confidence level of the edge currently linking the shirt node to the orange node is revised to include all user input received thus far (e.g., the positive explicit feedback from the first user that the color of the shirt is orange, the positive implicit feedback from the second user that the color of the shirt is orange, and the negative explicit feedback from the third user that the color of the shirt is not orange.) For instance, a predictive model such as a machine learning model takes as input the feedback from the three users and outputs a confidence level, for example, 80% representing a probability of 0.8 that the color of the shirt is orange. Note that the model may not give each user's feedback equal weight in the prediction of a confidence level. In this case, the first two users are given more weight with respect to their feedback as compared with the third user, and the confidence level associated with the edge linking the shirt node to the orange node is updated as a result of the third user's feedback from its previous value of 100% to a revised value of 80%.

In this manner, the schema is modified based at least in part on the user input (e.g., the second and third users' feedback), including by processing additional data (e.g., the selection of the third image by the second user in response to the second user's query asking for images having orange, and the indication from the third user in response to a prompt from the system that the color of the shirt is not orange but is red) to generate or revise one or more edges in the graph (e.g., re-evaluating the confidence level associated with the edge linking the shirt node to the orange node in response to feedback from all three users).

Another possible outcome in this example is that the system extracts additional data in response to the user input as described above (e.g., the feedback from the third user) and processes the additional data to generate one or more additional nodes in the graph. In this case, based at least in part on or in response to the third user's response that the color of the shirt is red, the system generates or infers an additional node or inferred node representing the color red and connects the shirt node to the red node via an inferred edge. Depending on the inference mechanism, the inferred edge is associated with a confidence level or estimated probability, which can be based on the output of a machine learning model. In this case, however, if the third user is the only user that has identified the color of the shirt in this particular image as red, the system may associate a confidence level of 100% or an estimated probability of 1 to the inferred edge based on the single piece of data (i.e., the feedback from the third user). Alternatively, the confidence level or estimated probability may be lower if the system is configured to take into account a measure of the third user's reliability based on a past history of the user's observations regarding judgment of color.

In some embodiments, the system is configured such that an edge is not written or overwritten in response to additional data, but rather, each observation of each user is stored so that the system has access to conflicting evidence regarding a prediction and each user's observation is retained and used as feedback by the system in response to future queries. Thus, while the edge representing the outcome or end result of a given query (e.g., the edge linking the shirt node to the orange node) might be updated to provide the system's best prediction at the time of the query, the individual observations or feedback from users are retained by the system and inform future predictions.

In some cases, the inference mechanism includes a plurality of models which are used to infer nodes and edges between nodes. In the example above, a model or a plurality of models can be applied to generate or determine a confidence level for a user based on, for instance, the user's historical performance. For example, the system is configured to capture a particular user's input and determine whether that particular user has demonstrated to be an accurate judge of color in the past. Feedback or user input from different users is then weighted according to each user's past performance representing the system's confidence in each user's judgment. In some instances, a graph model can be used to capture user-related information. For example, each user can be represented by a node in a graph model from which attributes of that user are stored as additional nodes linked by edges to the user node.

In other cases, in addition to prompting the user for explicit feedback (e.g., a direct question such as "Is the shirt in this image orange in color?"), the system also prompts the user for an indication of how confident the user is in his or her observation (e.g., via a field that asks the user to select a level of confidence such as "definitely," "maybe," or "not so sure" or alternatively, a numerical range such as a scale of 1-10, with 10 being highly confident and 1 being not confident). In these cases, in response to the user input with respect to the user's confidence in his or her own observation, the system adjusts the confidence level or probability of the edge associated with the user's observation.

In some cases, a user of the system can use the interface to view data in the form of images or text and to select certain items by clicking on a selection element, such as a selection box, a link, or an image that is displayed to the user. In addition to inferring relationships between such items that a user selects, the disclosed system can also be configured to predict properties of items. For example, in some instances, the system predicts a probability or confidence level that a user would provide positive feedback such as a "thumbs up," indicating that the user likes or approves of an item, or alternatively a "thumbs down," indicating that the user dislikes or disapproves of the item, based on the item itself and its relation to other items.

As described above, a distinct advantage of the disclosed method and system over existing and prior systems is the ability to manage uncertainty in unstructured data, including incorrect, incomplete, and missing data, by inferring a provisional structure and generating a schema that captures uncertainty in the data in a form or construct that can be queried. In particular, in response to receiving a query, each node in the schema can be queried on its own, or the system can crawl through relationships or edges that connect various nodes in the schema and aggregate the results to provide a response.

Returning to the system 100 of FIG. 1, in some embodiments the inference engine 130 includes a query engine (not shown) configured to receive a query via the interface 150 and to process the query into a series of requests that can be used by various search indices to perform searches over the data in the system.

For example, a full text index is used to query specific fields while a graph index is used to crawl through various entities in the graph. Thus, in some cases, an implementation of a searching mechanism in the disclosed system includes two indices—a traditional search index and a traditional key value index. These two indices are used to perform two operations—searching over the data in the system (e.g., stored as nodes) using the search index and navigating pointers in the graph along the traditional key value index. Additionally, in some cases, the system includes an efficient index used for asking questions and returning responses regarding the confidence levels or estimated probabilities of relationships between nodes. It is the function of the query engine to receive, process, and translate the query into a series of requests to this efficient index.

In some embodiments, given a point in time when a query is received, the schema or graph is fixed, frozen, or held in its current state as it exists at the given point in time. For example, one embodiment of the disclosed method includes fixing or freezing a set of assumptions or inferences at a point in time when a query is received and using that set of assumptions or inferences to provide a response to the query in terms of the relationships the system has assumed as represented by the current state of the graph.

The mechanics of the search and how the search is performed can depend on the semantics that the system is configured for and that the user expects. For example, in terms of a choice of formulation, confidence levels and estimated probabilities associated with edges that represent relations between pieces of data are only really important when a query is run because these values are only needed in the context of a particular question.

In some embodiments, the disclosed system receives a query and based at least in part on or in response to the query, the system performs a search if needed, performs computations as needed, and returns a result or a response to the query. In some cases, the system observes the current graph, produces intermediate data structures as necessary, and then outputs the result. The system may store the intermediate data structures in a short term or long term storage, or may simply discard the intermediate data structures after determining a response to the query. Similarly, the system might store an observation that a particular user asked a particular question for the sake of answering future queries, or alternatively, it may discard the observation after determining a response to the query.

Figure 8:
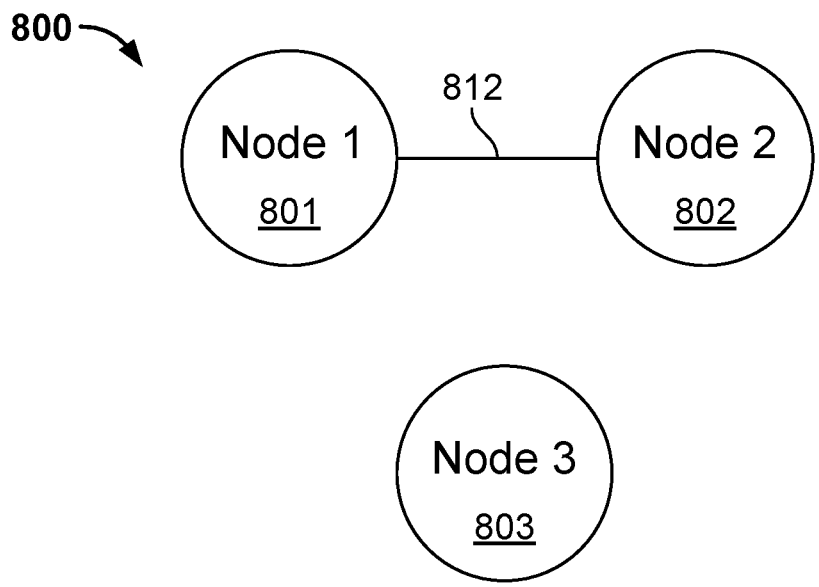
FIG. 8 depicts a schema comprising a graph having a plurality of nodes.

As an example, FIG. 8 depicts a schema 800 generated according to an exemplary method as described herein, wherein the schema comprises a graph having a plurality of nodes. In the example shown, the plurality of nodes includes three nodes labeled as Node 1 at 801, Node 2 at 802 and Node 3 at 803, wherein Node 1 is linked to Node 2 via an edge at 812, and Node 3 is unlinked.

Suppose that, at a given point in time, a query is received referring to Node 1 and asking the system to return any related things about Node 1. In some cases, the schema or graph is fixed, frozen, or held in its current state as it exists at the given point in time. Here, the schema 800 represents the current state of the graph at the given point in time when the query is received. One way the system can perform the search is to take this current state of the graph as it exists in the system, perform the search based on this current state, and return a result or response according to this current state. In this case, the current state of the graph shows that a relationship exists between Node 1 and Node 2, but that Node 3 is unlinked and therefore not related to Node 1. Accordingly, in response to a query based on a search performed on the current state of the graph, the system will return Node 3. Thus, in this particular case, the system fixes, freezes, or holds a set of assumptions or inferences at a given point in time when a query is received and, using that set of assumptions or inferences, provides a response to the query in terms of the relationships the system has assumed as represented by the current state of the graph.

Alternatively, in response to a query, in some embodiments, the system is configured to run the inference engine against the current state of the graph to extract relevant information and make appropriate inferences that serve to inform the response.

Continuing with the example described with respect to FIG. 8, suppose that, at a given point in time, a query is received referring to Node 1 and asking the system to return any related things about Node 1. But here, instead of taking the current state of the graph as it exists as depicted in FIG. 8 and performing the search based on this current state with its associated assumptions and inferences regarding Node 1, the system runs the inference engine against the current state in response to the received query. In particular, in order to provide a response to the received query asking for things that are related to Node 1, the system runs the inference engine against Node 1, Node 2, and Node 3 to extract information and to infer any relevant relationships that might inform a response to the query.

Figure 9:
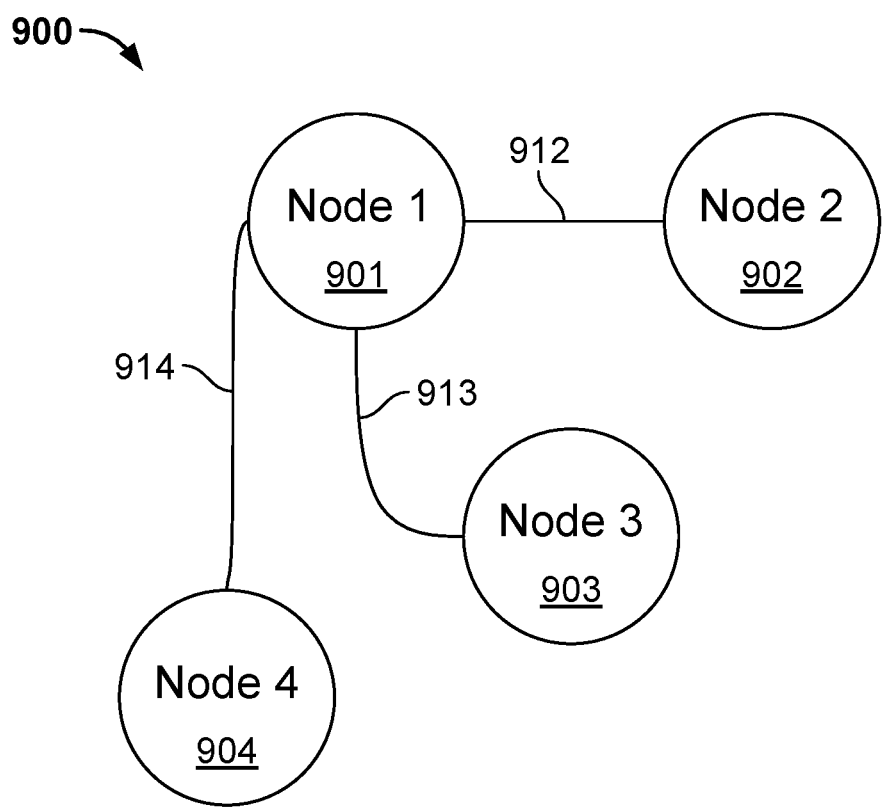
FIG. 9 depicts a schema generated as a result of running the inference engine in response to a query.

FIG. 9 depicts a schema 900 generated as a result of running the inference engine in response to the query against the current state of the graph at the given time the query is received as shown in FIG. 8. As in FIG. 8, the schema 900 comprises a graph having a plurality of nodes including three nodes labeled as Node 1 at 901, Node 2 at 902 and Node 3 at 903, wherein Node 1 is linked to Node 2 via an edge at 912.

However, as depicted in FIG. 9, running the inference engine against the graph of FIG. 8 generates new or additional inferences. Specifically, the inference engine has inferred that an edge at 913 exists between Node 1 at 901 and Node 3 at 903, which were previously unlinked according to the schema 800 of FIG. 8. Moreover, the inference engine has also generated a new inferred node—Node 4 at 904—which is shown as related to Node 1 by an edge at 914 linking Node 1 at 901 to Node 4 at 904.

In the example described with respect to FIG. 9, the current state of the graph is still fixed at the time the query is received with respect to incoming data, but is allowed to change or be modified based on inferences made in response to the received query. As a result, in response to a query based on a search performed after running the inference engine on the current state of the graph, the system will return Node 2, Node 3, and Node 4.

Continuing with this particular example, suppose that a subsequent query is received that requires information regarding how strong the relationship is between Node 1 and Node 2. In response to the subsequent query, the system runs the inference engine against the current state of the graph as depicted in the schema 900 of FIG. 9 to return a confidence level or estimated probability for the edge at 912. Similarly, if the query received requires information regarding the strength of all relationships between Node 1 and any related nodes, the system runs the inference engine against the current state of the graph as depicted in the schema 900 of FIG. 9 to return a confidence level or estimated probability for each edge linking Node 1 to another node in the graph. In this case, values indicative of the strength of the relationship are determined for edges at 912, 913, and 914 respectively.

As an example of how a search is performed in response to a query, suppose a set of advertisements is received as semi-structured data (e.g., unlabeled image data) by the disclosed system (e.g., system 100), which generates a schema from the received data. A user inputs a query asking the system to provide all images of advertisements having a white background. The query is received by the system (e.g., via interface 150 of FIG. 1) and processed by the query engine into a series of requests. For instance, one request in this case is to run a search (e.g., using a graph index) that returns nodes only linked to a "file type=image" node. In some cases, the system can filter the search to return results having a particular confidence level or estimated probability indicating the likelihood that the file being returned is an image.

Note that, for each asset present in the system (e.g., an image or a video file), there is a generated schema, which has attributes saved as fields, like the background of an image or a video. The background field in this case is something that is generated from an inference or predictive mechanism such as a machine learning model that takes an image as an input and outputs a subset of a JSON object as an output.

This, in this particular example, information has been previously extracted from nodes in the schema (e.g., using machine learning models) as to what images have a white background. This extracted information is indexed so that it can be searched in response to a query. Additionally, any text associated with an image is also indexed (e.g., in a full text index) and can be searched.

As described above, an advantage of the disclosed technique is that a marketer looking for a piece of content might type in a search bar of the interface, "white background." In response to this user input, the disclosed system performs a search over the current state of the graph and returns a series of images that the system believes have a white background. In response to the images provided by the system, the marketer provides feedback that certain of the returned images do not have a white background. Asynchronously from the analysis being performed to respond to the query, the inference engine determines that the inference of the background being white in the images identified by the marketer as not having white backgrounds is now invalid and adjusts this inference and re-indexes the images accordingly. In particular, the system uses this feedback to adjust the inference or prediction mechanism, which in this case is a machine learning model, and the model is modified and improved as a result of the feedback. As described in this particular example, it is this aspect of incorporating feedback and capturing uncertainty in relationships between pieces of data to modify and improve the current state of the graph that differentiates the disclosed technique from existing and prior systems that rely on a relational model.

The approach as described above can be used to connect to various parts of a business and to learn from information that is already being produced. This allows the system to provide structure to unstructured data and to estimate relationships that may be uncertain between pieces of data in a construct or structural schema that has enough flexibility and adaptability to fill in the gaps as new information or user feedback is received. This technique also enables users to ask questions and to get meaningful answers, as the graph is built to generate structured bits of information and to form relations between those bits of information from user input that does not have to contain explicit labels for training a predictive model.

In contrast, the relational way of describing these processes is not flexible enough to account for the volatility and the variety of information that is received in current applications. For instance, adding a source of information (e.g., a new set of presentations or slides that are received in an unrecognizable form) is problematic using a relational database, where every table and view must be changed in order to add the information in a relational way. But unlike systems that use a relational model, adding a source of information and in particular, information that includes unstructured data where the system is unable to recognize the type of data being received, is readily handled by the method and system disclosed herein, which can generate new nodes for pieces of data regardless of the form in which it is received and can capture relationships between the pieces of data regardless of how certain those relationships are.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for running queries over unstructured data, comprising:
    a processor; and
    a memory coupled with the processor, wherein the memory is configured to provide the processor with instructions which when executed cause the processor to:
        generate a schema from the unstructured data, wherein the schema comprises a graph having a plurality of nodes;
        infer a structure from the unstructured data by adding a data node or an edge to the schema, wherein the data node or the edge is based at least in part on data extracted from the unstructured data and wherein the edge represents a relationship between two nodes in the schema, wherein the inferring of the structure comprises to:
        generate the data node based on one or more of the following:
        A) generate a property node based at least in part on a property associated with the data node; and add the property node to the schema;
        B) generate a property node based at least in part on a property associated with the data node;
            generate a property-data edge between the property node and the data node, wherein the property-data edge represents a relationship between the property node and the data node; and
            add the property node and the property-data edge to the schema; and/or
        C) determine a property associated with the data node;
            generate a property node based at least in part on the property;
            generate a property-data edge between the property node and the data node, wherein the property-data edge represents a relationship between the property node and the data node; and
            add the property, the property node, and the property-data edge to the schema;
        generate an inferred node or an inferred edge that is added to the graph based at least in part on user input, wherein the inferred node or the inferred edge is based at least in part on an output of a machine learning model;
        apply a model to the data node to determine a data type associated with the added data node; and
        infer an attribute of the data node based on a first data type or a second data type, wherein the inferred attribute is stored as another node to the schema; and
    receive a query and return a query result, wherein the query result is provided by searching the schema, and wherein the schema is configured to receive and be modified by user input.

2. The system of claim 1, wherein the generating of the schema from the unstructured data includes to store the data extracted from the unstructured data as the data node in the graph.

3. The system of claim 1, wherein the generating of the schema from the unstructured data includes to store the data extracted from the unstructured data as the data node in the graph.

4. The system of claim 1, wherein at least one of the nodes is connected to another node in the plurality of nodes by an edge, wherein the edge represents a relationship between the nodes connected by the edge.

5. The system of claim 1, wherein:
    the edge includes a confidence level.

6. A method for running queries over unstructured data, comprising:
    generating a schema from the unstructured data, wherein the schema comprises a graph having a plurality of nodes connected by edges;
    adding a data node or an edge to the schema, wherein the data node or the edge is based at least in part on data extracted from the unstructured data, wherein the edge represents a relationship between two nodes in the schema, and wherein the adding of the data node or the edge to the schema comprises:
        generating the data node based on one or more of the following:
        A) generating a property node based at least in part on a property associated with the data node; and adding the property node to the schema;
        B) generating a property node based at least in part on a property associated with the data node;
            generating a property-data edge between the property node and the data node, wherein the property-data edge represents a relationship between the property node and the data node; and
            adding the property node and the property-data edge to the schema; and/or
        C) determining a property associated with the data node;
            generating a property node based at least in part on the property;
            generating a property-data edge between the property node and the data node, wherein the property-data edge represents a relationship between the property node and the data node; and
            adding the property, the property node, and the property-data edge to the schema;
    generating an inferred node or an inferred edge that is added to the graph based at least in part on user input, wherein the inferred node or inferred edge is based at least in part on an output of a machine learning model;

applying a model to the data node to determine a data type associated with the added data node; and inferring an attribute of the data node based on a first data type or a second data type, wherein the inferred attribute is stored as another node to the schema;

searching the schema in response to receiving a query; and returning a query result based at least in part on searching the schema.

7. The method of claim 6, further comprising receiving user input and modifying the schema based at least in part on the user input.

8. The method of claim 6, wherein generating the schema from the unstructured data includes storing the data extracted from the unstructured data as the data node in the graph.

9. The method of claim 6, further comprising adjusting the machine learning model based at least in part on the user input.

10. A computer program product for running queries over unstructured data, the computer program product being embodied in a tangible non-transitory computer readable storage medium and comprising computer instructions for:

generating a schema from the unstructured data, wherein the schema comprises a graph having a plurality of nodes connected by edges;

adding a data node or an edge to the schema, wherein the data node or the edge is based at least in part on data extracted from the unstructured data, wherein the edge represents a relationship between two nodes in the schema, and wherein the adding of the data node or the edge to the schema comprises:

generating the data node based on one or more of the following:

A) generating a property node based at least in part on a property associated with the data node; and
  adding the property node to the schema;

B) generating a property node based at least in part on a property associated with the data node;
  generating a property-data edge between the property node and the data node, wherein the property-data edge represents a relationship between the property node and the data node; and
  adding the property node and the property-data edge to the schema; and/or C) determining a property associated with the data node;
  generating a property node based at least in part on the property;
  generating a property-data edge between the property node and the data node, wherein the property-data edge represents a relationship between the property node and the data node; and
  adding the property, the property node, and the property-data edge to the schema;

generating an inferred node or an inferred edge that is added to the graph based at least in part on user input, wherein the inferred node or inferred edge is based at least in part on an output of a machine learning model;

applying a model to the data node to determine a data type associated with the added data node; and inferring an attribute of the data node based on a first data type or a second data type, wherein the inferred attribute is stored as another node to the schema;

searching the schema in response to receiving a query; and returning a query result based at least in part on searching the schema.

* * * * *